Aug. 6, 1940.   W. H. THWAITS   2,210,271
FISH GAFF
Filed May 4, 1939
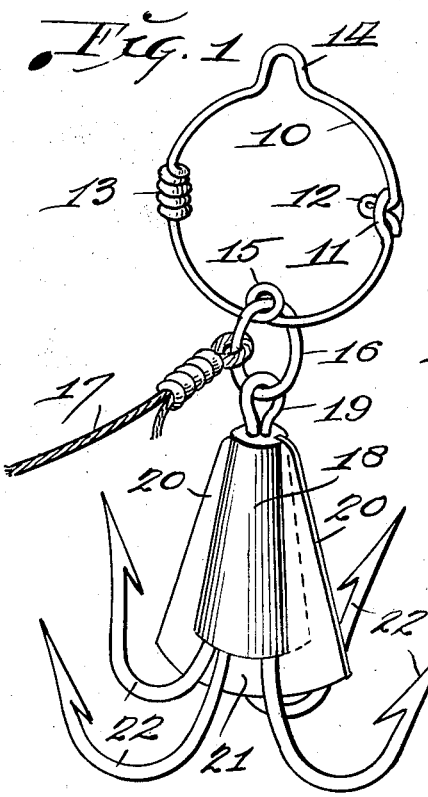
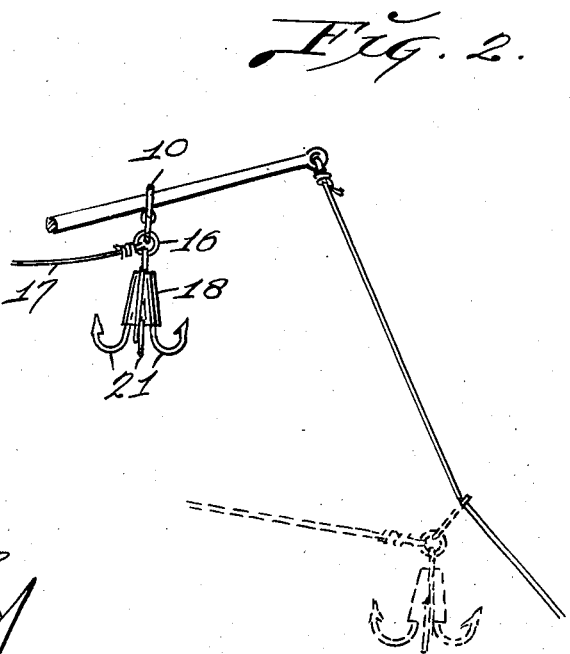
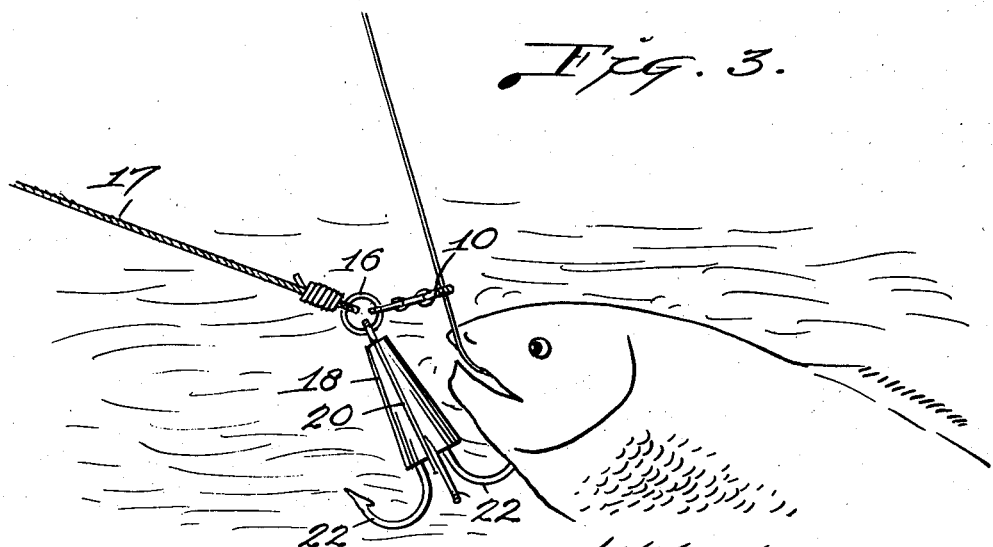
INVENTOR:—
WILLIAM H. THWAITS.
BY Martin P. Smith
ATTY.

Patented Aug. 6, 1940

2,210,271

UNITED STATES PATENT OFFICE 2,210,271

FISH GAFF

William H. Thwaits, Los Angeles, Calif.

Application May 4, 1939, Serial No. 271,675

7 Claims. (Cl. 43—5)

My invention relates to a fish gaff and has for its principal object the provision of a relatively simple, practical and inexpensive gaff that may be easily and conveniently manipulated for the effective gaffing of a fish after the same has been caught on the conventional hook.

A further object of my invention is, to provide a gaff that includes a plurality of gaff hooks carried by a weight and the latter being pivotally suspended from a ring that is adapted to slide lengthwise upon a fishing pole and thence downwardly on the line carried by said pole, in order that the device may by gravity travel to the end of a line on which the fish is hooked and, the device including simple and efficient means in the form of a gaff line for manipulating the hook carrying member of the gaff in order to cause one or more of the hooks to move toward and gaff the fish that is caught on the hook of the fishing line.

Further objects of my invention are, to provide an effective fish gaff that does not require the use of a special tool or rod in its manipulation and further, to provide a gaff that is of compact structure so that it will occupy comparatively little space when packed for storage or transportation.

With the foregoing and other objects in view, my invention consists in certain novel features of construction and arrangement of parts that will be hereinafter more fully described and claimed and illustrated in the accompanying drawing in which:

Fig. 1 is a perspective view of a fish gaff constructed in accordance with my invention.

Fig. 2 is an elevational view of the end of a fishing pole with the line attached thereto, with solid lines showing the gaff in position upon the pole and with dotted lines showing the position of the gaff while traveling by gravity down the fishing line.

Fig. 3 is a side elevational view of the gaff with one of the hooks thereof in engagement with a fish.

Referring by numerals to the accompanying drawing which illustrates a preferred embodiment of my invention, 10 designates a ring, preferably formed from a single piece of resilient wire and of such size as to slide freely lengthwise along the fish pole with which the gaff is used.

One end of the piece of wire that forms this ring is bent to form an eye 11 and the other end is bent inwardly and thence outwardly to form a short finger or hook 12 that is adapted to enter the eye and hold the ring in closed position.

A portion of the wire opposite the eye 11 and finger 12 is coiled to form a short spring 13, the tension of which tends to spread the ends of the wire forming the ring apart, so that when the eye 11 is pressed inwardly or the finger 12 is pulled outwardly, the ends of the ring will spring apart a sufficient distance to enable the ring to be readily placed upon the fish pole.

A portion of the wire at the top of the ring is bent upward to form an inverted U-shaped member 14 that receives the fish line as the gaff leaves the end of the pole and slides downwardly upon said line.

A portion of the wire at the bottom of the ring is bent to form a loop or eye 15 and, passing through said eye is a ring 16. Secured to this ring is one end of a flexible member 17 that functions as a hand line for manipulating the gaff while the same is traveling down the fish line and while being moved toward the fish that is caught on the hook at the end of the line.

A weight 18, preferably formed of metal, such as lead, and which gradually increases in size toward its lower end is provided at its upper end with an eye 19 that receives ring 16. Secured to weight 18 and extending lengthwise thereof on diametrically opposite sides are wings 20, preferably formed of thin sheet metal, and the lower ends of these wings are connected by an integral plate 21 that is positioned beneath the lower end of the weight.

Rigidly fixed to the lower portion of the body of the weight 18 and extending downwardly and thence upwardly is a plurality of gaff hooks 22 of the barbed type.

In the use of my improved gaff, the same may be positioned on the pole during the fishing period or it may be applied to said pole after a large fish has been caught on the hook carried by the fish line and, if applied to the pole during the fishing period the pole must necessarily be held approximately level or with its distal end slightly elevated in order to prevent the ring that carries the gaff from sliding down the pole by gravity.

When a large fish has been hooked and there is danger or possibility of the fish getting away before being landed, the fisherman lowers the distal end of the pole in order that the ring 10 actuated by the weight of the suspended parts will slide down the pole and thence onto the line connected to the end thereof and, during this action the line 17 is paid out until the gaff reaches the end of the line. During the travel of the ring 10 down the fish line, the latter passes through the inverted U-shaped portion 14 at the top of the ring.

When the gaff reaches a position immediately adjacent the hook upon which the fish is caught, the fisherman jerks one or more times upon the line 17 and, as a result of which jerk the ring 10 is swung into a position approximately at right angles to the line so as to carry the upper portion of the weight 18 away from the head of the fish and, the water offering resistance to the wings 20 and plate 21 causes the suspended portion of the gaff, including the weight 18 and hooks 22, to swing toward the head of the fish so that at least one or more of the gaff hooks will gaff the fish, thus accomplishing the desired result.

After the fish has been gaffed, it is drawn in by means of the gaff line 17.

In Fig. 2, dotted lines show the gaff in position as it travels down the fish line and, in Fig. 4 the suspended portion of the gaff, including the hooks 22, is shown in position as it is swung against the head of the fish to gaff same.

Thus it will be seen that I have provided a fish gaff that is relatively simple in construction, inexpensive of manufacture and very effective in performing the functions for which it is intended.

It will be understood that minor changes in the size, form and construction of the various parts of my improved fish gaff, may be made and substituted for those herein shown and described, without departing from the spirit of my invention, the scope of which is set forth in the appended claims.

I claim as my invention:

1. In a fish gaff, a ring, a weight suspended from said ring, a wing projecting from said weight, and a plurality of gaff hooks carried by the lower end of said weight.

2. A fish gaff comprising a ring, a weight suspended therefrom, a plurality of gaff hooks carried by the lower end of said weight, and wings projecting from opposite sides of said weight.

3. A fish gaff comprising a ring, a weight suspended therefrom, a plate carried by said weight and projecting outwardly from opposite sides thereof and downwardly from the bottom thereof, and a plurality of gaff hooks carried by the lower portion of said weight.

4. In a fish gaff, an open ring, means for detachably connecting the ends thereof, a weight suspended from said ring, a wing projecting from said weight, and a plurality of gaff hooks connected to the lower end of said weight.

5. A fish gaff as set forth in claim 4 and said ring being provided on its upper portion with a substantially inverted U-shaped line receiving member.

6. A fish gaff comprising a ring, a smaller ring depending from the lower portion of said first mentioned ring, a weight suspended from said smaller ring, a plurality of gaff hooks carried by the lower portion of said weight, and a line connected to said smaller ring.

7. A fish gaff as set forth in claim 6, and with wings projecting from opposite sides of said weight.

WILLIAM H. THWAITS.